United States Patent [19]

Teramachi

[11] Patent Number: 4,702,622
[45] Date of Patent: Oct. 27, 1987

[54] LINEAR SLIDE ROLLER BEARING UNIT

[76] Inventor: Hiroshi Teramachi, 2-34-8, Higashi-Tamagawa, Setagaya-ku, Tokyo, Japan

[21] Appl. No.: 22,492

[22] Filed: Mar. 6, 1987

Related U.S. Application Data

[63] Continuation of Ser. No. 882,447, Jul. 7, 1986, abandoned, which is a continuation of Ser. No. 684,707, Dec. 21, 1984, abandoned.

[30] Foreign Application Priority Data

Dec. 29, 1983 [JP] Japan .................................. 58-248789

[51] Int. Cl.$^4$ ............................................. F16C 29/06
[52] U.S. Cl. ........................................................ 384/44
[58] Field of Search ..................................... 384/43–45, 384/50, 53, 55

[56] References Cited

U.S. PATENT DOCUMENTS

| 4,296,974 | 10/1981 | Teramachi | 384/45 |
| 4,302,059 | 11/1981 | Teramachi | 384/44 |
| 4,396,235 | 8/1983 | Teramachi | 384/44 |

Primary Examiner—Stuart S. Levy
Assistant Examiner—David Werner
Attorney, Agent, or Firm—Kenyon & Kenyon

[57] ABSTRACT

A linear slide roller bearing unit has an elongated track shaft having left and right ridges projected laterally from both sides thereof and extending along the length thereof, each ridge being provided at each of its sides with loaded roller surfaces directed upwardly and obliquely downwardly and extending along the length of the ridge. The bearing unit further has a bearing block mounted on the track shaft for movement along the length of the track shaft. The bearing block has a substantially inversed U-shaped cross-section constituted by an upper horizontal flat portion and skirts suspended from both sides of the horizontal flat portion. The horizontal flat portion is provided in its upper and lower sides with pairs of non-loaded roller grooves and loaded roller grooves extending along the length of the bearing block. The non-loaded grooves are connected to the loaded grooves through turning grooves. The skirt have slanted lower end surfaces directed inwardly and downwardly, and are provided at their mid portions with guide ridges extending along the length of the bearing block. The slanted end surfaces are provided at one sides of the guide ridges with loaded rolling surfaces opposing to the obliquely downwardly directed loaded roller rolling surfaces on the track shaft and at the other sides of the guide ridge with non-loaded roller rolling surfaces.

3 Claims, 26 Drawing Figures

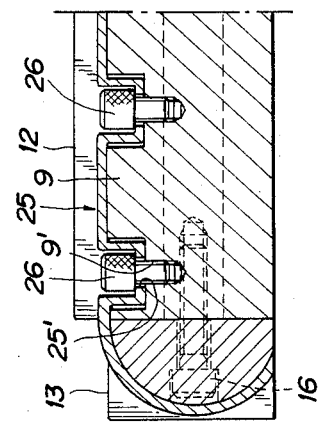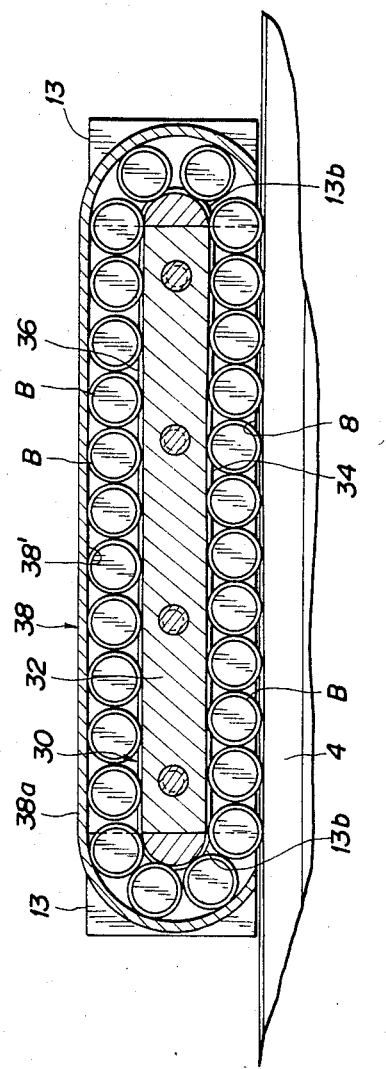

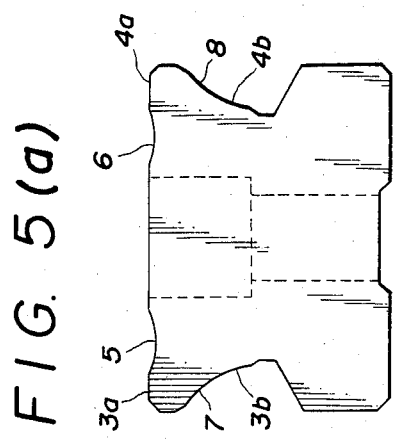
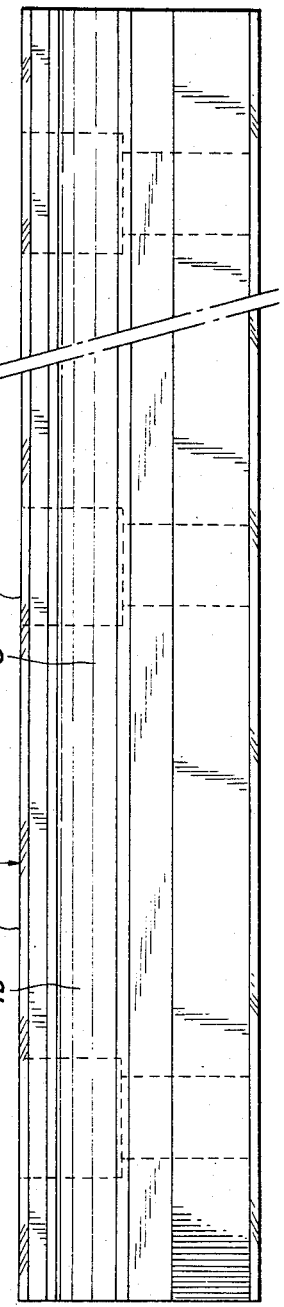

FIG. 7(a)
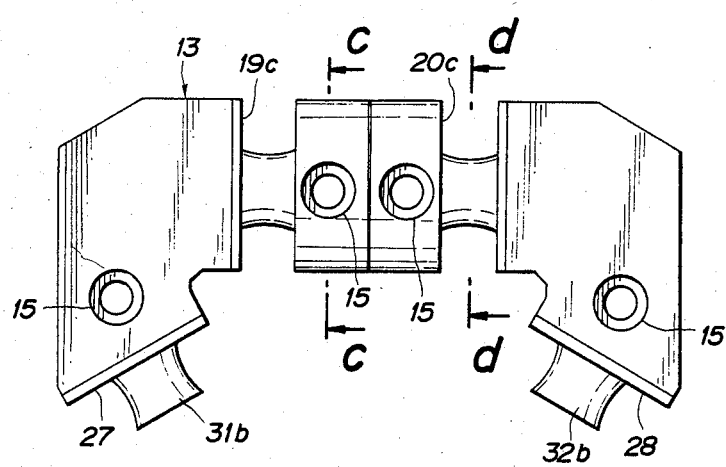
FIG. 7(c)
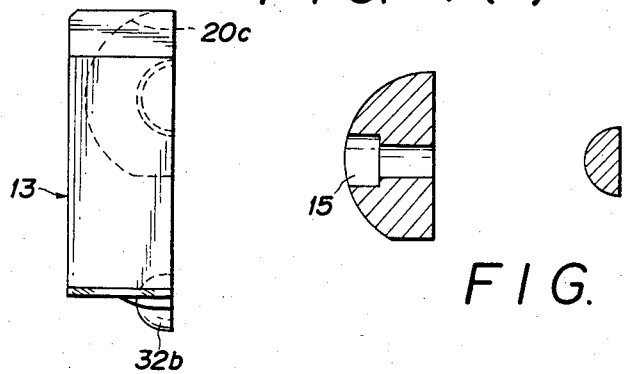
FIG. 7(d)
FIG. 7(b)

LINEAR SLIDE ROLLER BEARING UNIT

This application is a continuation of application Ser. No. 882,447, filed July 7, 1986, now abandoned, which is a continuation of application Ser. No. 684,707, filed Dec. 21, 1984, now abandoned.

BACKGROUND OF THE INVENTION

The present invention relates to a linear slide roller bearing unit suited to use in sliding machine parts such as the table saddle of a machine tool, slider of a machining center and a slider of a conveyor robot which moves here and there while carrying a heavy load.

Known linear slide roller bearing unit of the type mentioned above has a bearing block having a channel-shaped cross-section and is mounted on a track shaft having a substantially trapezoidal cross-section through an intermediary of a train of cylindrical rollers. The bearing block is movable along the length of the track shaft as the rollers roll in contact with the surfaces of the bearing block and the track shaft. This known bearing unit, however, suffers from disadvantages in that it cannot satisfactorily resist an upward load which causes a floating tendency of the bearing block, as well as radial loads which unstabilize the bearing block on the track shaft.

SUMMARY OF THE INVENTION

Accordingly, an object of the invention is to provide a linear slide bearing unit capable of sufficiently withstanding upward and radialloads, as well as loads acting in all directions, and improved to permit an easy machining of the roller rolling grooves on which the rollers roll.

To this end, according to the invention, there is provided a linear slide roller bearing unit comprising: an elongated track shaft having left and right ridges projected laterally from both sides thereof and extending along the length thereof, each ridge being provided on each of its sides with loaded roller rolling surfaces directed vertically upwardly and obliquely downwardly and extending along the length of the ridge; a bearing block mounted on the track shaft in a manner like a saddle for movement along the length of the track shaft, the bearing block having a substantially inversed U-shaped cross-section constituted by an upper horizontal flat portion and skirts suspended from both sides of the horizontal flat portion, the horizontal flat portion being provided in its upper and lower sides with pairs of non-loaded roller grooves and loaded roller grooves extending along the length of the bearing block, the non-loaded ball grooves being connected to the loaded ball grooves through turning grooves, the skirts having slanted lower end surfaces directly inwardly and downwardly, the slanted lower surfaces being provided at their mid portions with guide ridges extending along the length of the bearing block, the slanted end surfaces being provided at one sides of the guide ridges with loaded roller rolling surfaces opposing to the obliquely downwardly directed loaded roller rolling surfaces on the track shaft and at the other sides of the guide ridge with non-loaded roller rolling surfaces; four rows of rollers interposed between the opposed loaded roller grooves in the bearing block and loaded roller rolling surfaces on the track shaft and between the non-loaded roller rolling grooves and non-loaded roller rolling surfaces on the bearing block; side roller retainers secured to the end surfaces of the guide ridges and adapted to guide and retain the rollers disposed on the loaded roller rolling surfaces and non-loaded roller rolling surfaces formed at both sides of respective guide ridges; and an upper roller retainer secured to the upper surface of the bearing block and adapted to guide and retain the rollers disposed in the non-loaded roller rolling grooves formed in the upper surface of the bearing block.

The above and other objects, features and advantages of the invention will become clear from the following description of the preferred embodiments when the same is read in conjunction with the accompanying drawings.

BRIEF DESCRIPTION OF THE DRAWINGS

FIG. 3 is a sectional view taken along the line III—III of FIG. 1;

FIG. 4 is a sectional view taken along the line IV—IV of FIG. 1;

FIG. 5a is a front elevational view of a track shaft;

FIG. 5b is a side elevational view of the track shaft;

FIG. 7a is a front elevational view of both end portions of the bearing block;

FIG. 7b is a side elevational view of the end portions of the bearing block;

FIG. 7c is a sectional view taken along the line c—c of FIG. 7a;

FIG. 7d is a sectional view taken along the line d—d of FIG. 7a;

FIG. 9b is a side elevational view of the roller retainer shown in FIG. 9a;

DESCRIPTION OF THE PREFERRED EMBODIMENTS

Figure 1:
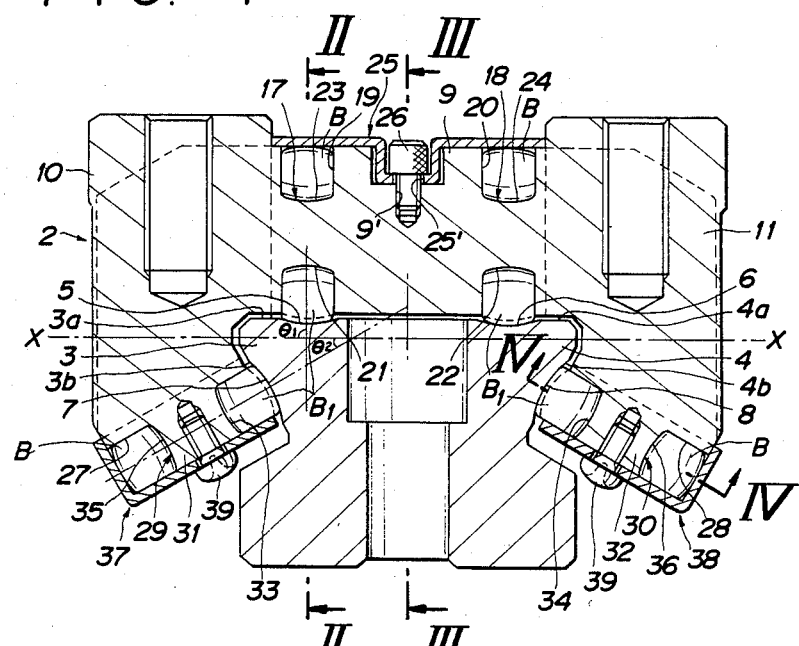
FIG. 1 is a sectional front elevational view of a linear slide roller bearing unit in accordance with an embodiment of the invention.

A first embodiment of the linear slide roller bearing of the invention will be described hereinunder with reference to FIGS. 1 to 11.

A linear slide roller bearing in accordance with a first embodiment of the invention has an elongated track shaft 1 mounted on a stationary bed. The track shaft 1 has a left side ridge 3 and a right side ridge 4 which project laterally from both sides thereof. These ridges 3 and 4 are provided on their surfaces with loaded-roller rolling surfaces 5 to 8 on which loaded rollers roll. The ridges 3 and 4 with these rolling surfaces 5 to 8 are formed in symmetry with respect to the neutral longitudinal axis of the track shaft 1 as illustrated. Each of the rolling surfaces has an arcuate contour conforming with a barrel-like outer configuration of rollers Bphd 1.

The linear slide bearing unit 2 further has a bearing block 2 having a substantially inversed U-shaped cross-section and mounted on the track shaft 1 in a manner like a saddle. As will be clearly seen from FIG. 1, the bearing block 2 has a horizontal flat portion 9 on the track shaft 1 and a pair of skirts 10 and 11 suspended from both sides of the horizontal flat portion 9.

In the illustrated embodiment, the bearing block 2 is composed of three sections: namely, a central section 12 and both end plates 13,13. As will be seen from FIGS. 6a,6b and 6c, the central section 12 constitutes the main part of the bearing block 2, while each end plate 13 has a front elevational form similar to that of the central block and separable into left and right halves at its mid portion, as will be understood from FIGS. 7a,7b,7c and 7d.

As shown in FIGS. 6 and 7, the three sections, i.e., the central section 12 and both end plates 13,13 are united to form the integral bearing body 2 by means of, for example, tie bolts 16 which are driven into screw holes 14 on both end surfaces past through bores 15.

Figure 2:
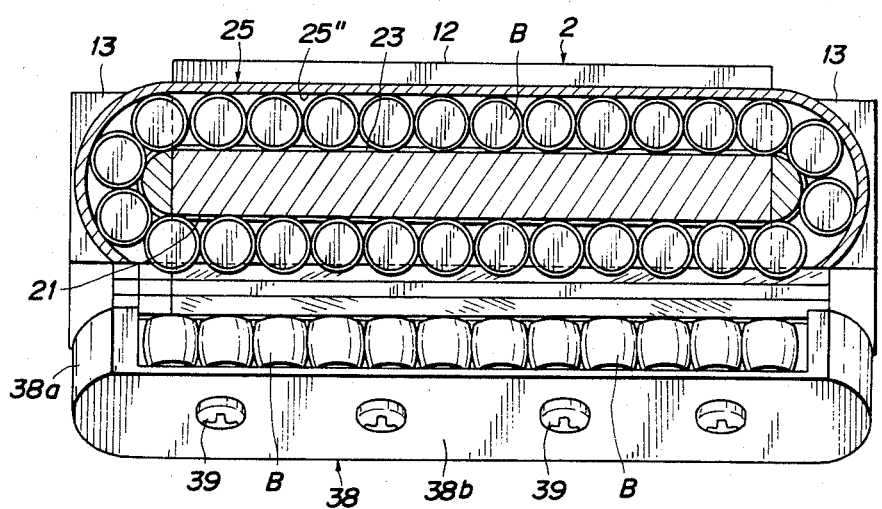
FIG. 2 is a sectional view taken along the line II—II of FIG. 1.
Figure 6A:
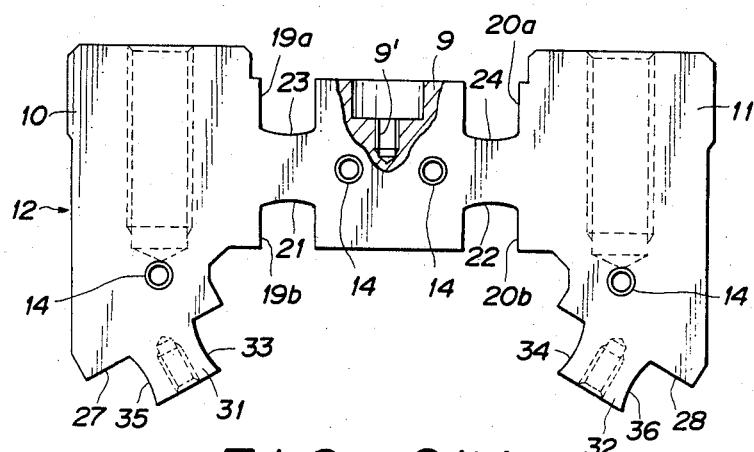
FIG. 6a is a front elevational view of the central portion of a bearing block.
Figure 6B:
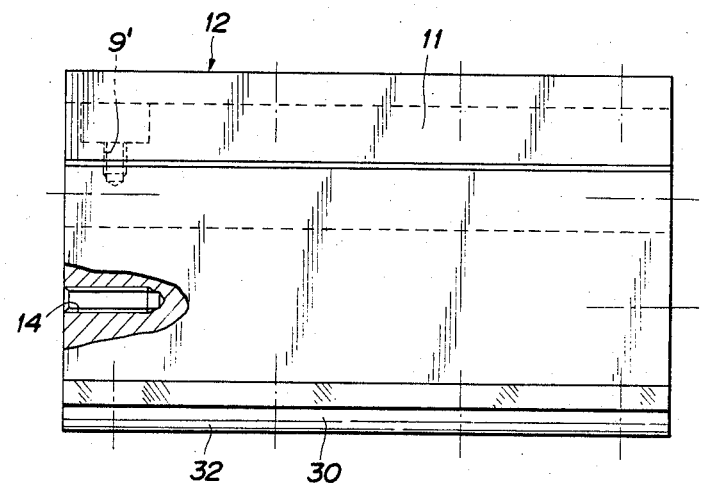
FIG. 6b is a partly cut-away side elevational view of the bearing block.
Figure 6C:
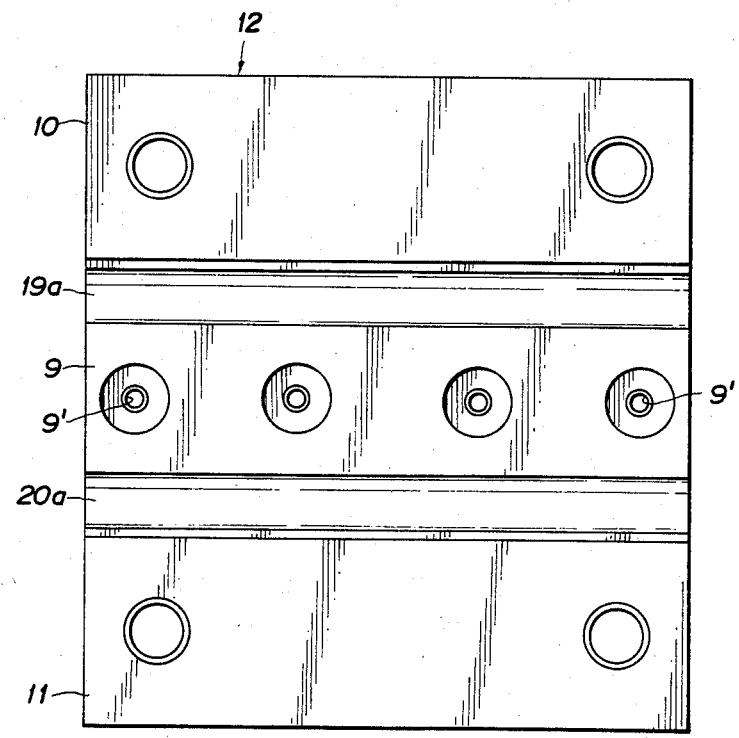
FIG. 6c is a plan view of the bearing block.
Figure 8A:
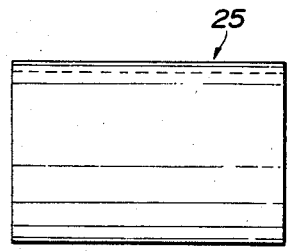
FIG. 8a is a front elevational view of a roller retainer on the horizontal flat portion of the bearing block.
Figure 8B:
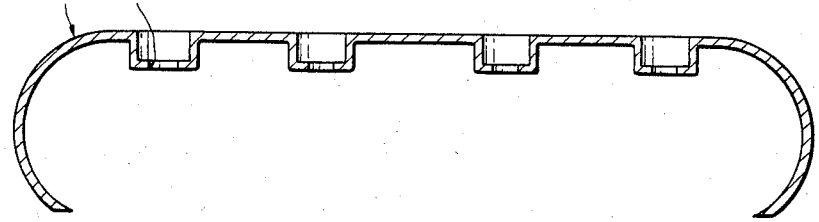
FIG. 8b is a side elevational view of the roller retainer.
Figure 8C:
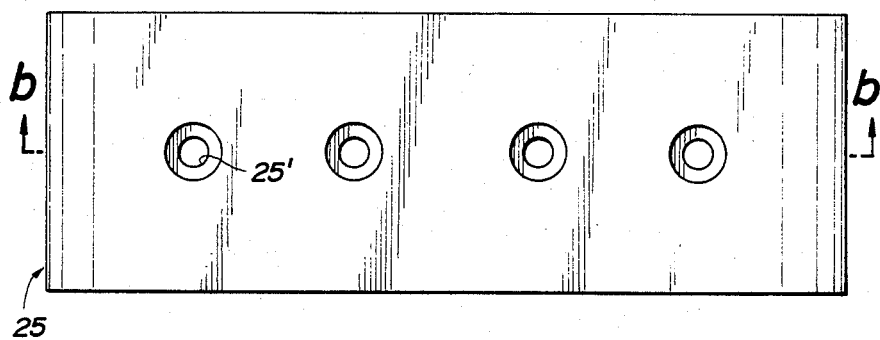
FIG. 8c is a plan view of the roller retainer.

As shown in FIGS. 1 and 2, endless grooves 19 and 20 are formed in the left and right side portions of the horizontal flat portion 9 of the bearing block 2 so as to form endless tracks each presenting elongated circular forms when viewed in side elevation as in FIG. 2. Trains of barrel-shaped rollers B are adapted to roll along those endless tracks. More particularly, as shown in FIGS. 6a and 6b, the central section 12 of the bearing block 2 is provided in the upper and lower sides thereof with longitudinal grooves 19a,20a and 19b,20b. These grooves have a breadth and a height substantially equal to those of the rollers B. At the same time, the end plates 13 have semicircular turning grooves 19c,20c which also have a breadth and height substantially equal to those of the rollers B. Surfaces 23,24 for allowing non-loaded rollers to run therealong (referred to as "non-loaded roller rolling surfaces", hereinunder) are presented by the bottom surfaces of the linear grooves 19a,20a formed in the upper side of the central section 12 of the bearing block 2. On the other hand, the bottom surfaces of the linear grooves 19b,20b formed in the lower side of the central section 12 present surfaces 21,22 for allowing loaded rollers to run therealong (referred to as "loaded roller rolling surfaces", hereinunder) which extend in parallel with the loaded roller rolling surfaces 5 and 6 formed on the upper surface of the track shaft 1. The rolling surfaces 21,22; 23,24 for non-loaded rollers and loaded rollers, respectively, are connected through the bottom surfaces of the semi-circular turning grooves 19c,20c formed in both end plates 13, so that two parallel roller circulation passages are formed on the bearing block 2. The bottoms of the loaded roller rolling surfaces 5,6,21,22, non-loaded roller rolling surfaces 23,24 and turning grooves 19c,20c have an arcuate contour which conforms with the outer configuration of the barrel-shaped rollers B.

As will be seen from FIGS. 1 and 2, a roller retainer 25 is provided to surround the outer surface of the horizontal flat portion 9 of the bearing block 2. This roller retainer serves to guide the movement of the barrel-shaped rollers B circulated along the non-loaded roller rolling surfaces 23,24.

In the illustrated embodiment, the roller retainer 25 is formed as a hoop-like member having a substantially elliptic longitudinal section with its lower side removed. The roller retainer 25 is adapted to be secured to the outer surface of the horizontal flat portion 9 by means of screws 26 which are driven into threaded holes 9' formed in the upper surface of the horizontal flat portion past screw holes 25' formed therein. The barrel-shaped rollers B are horizontally arrayed and held in the space formed between the inner surface 25" of the roller holder 25 and each non-loaded roller rolling surface 23,24. These rollers B are circulated along the loaded roller rolling surfaces 21 and 22 and the non-loaded roller rolling surfaces 23 and 24 on the bearing block 2 in a good order while rotating about their own axes.

During the circulation of the rollers B, these rollers are guided at their both axial ends by the side walls of two grooves 19 and 20 in the bearing block 2 because only small gaps are left between these side walls and axial end surfaces of the rollers. With this arrangement, therefore, it is possible to avoid any skew of the rollers and, hence, to ensure smooth running of the bearing block 2.

As shown in FIG. 1 and FIG. 6a, the skirts 10 and 11 are provided with slanted surfaces 27 and 28 which are extending downwardly and outwardly. Guide ridges 31 and 32 having a substantially elliptic or "track" shape when viewed in plan are formed along the center lines of these slanted surfaces 27 and 28 so as to extend in the longitudinal direction of the bearing block 2. Loaded roller rolling surfaces 33 and 34 are formed on the sides of both guide ridges 31 and 32 adjacent to the track shaft 1. These loaded roller rolling surfaces 33 and 34 extend along the length of the bearing block 2 so as to oppose the loaded roller rolling surfaces 7 and 8 on the track shaft 1 in parallel with these rolling surfaces 7 and 8. On the other hand, non-loaded roller rolling surfaces 33 and 34 are formed on the other sides of the guide ridges 31 and 32 so as to extend in the longitudinal direction of the bearing block 2 in parallel with the loaded roller rolling surfaces 33 and 34. The rolling surfaces 33,35 and 34,36 are connected through semi-circular turning grooves 13b formed in respective end plates 13 so that two endless roller circulating passages are formed on both skirts 10 and 11 of the bearing block 2. The loaded roller rolling surfaces 35 and 36 and the turning grooves 13b have an arcuate contour conforming with the outer configuration of the barrel-shaped rollers B.

The geometrical relationship between the loaded balls $B_1$ and the loaded roller rolling surfaces 5 to 8,21,22,33 and 34 on the track shaft 1 and the bearing block 2 is as follows. Namely, as shown in FIG. 1, the loaded balls $B_1$ positioned at the upper side of the track shaft 1 make contact with their associated rolling surfaces at a contact angle $\theta_1$ of about 90°, while loaded rollers $B_1$ disposed at both lateral sides of the track shaft 1 make contact with the loaded roller rolling surfaces 5 to 8 on the track shaft at a contact angle $\theta_2$ of about 45°. With this arrangement, the bearing block 2 is stably held on the track shaft 1 against loads acting in all directions.

Figure 11A:
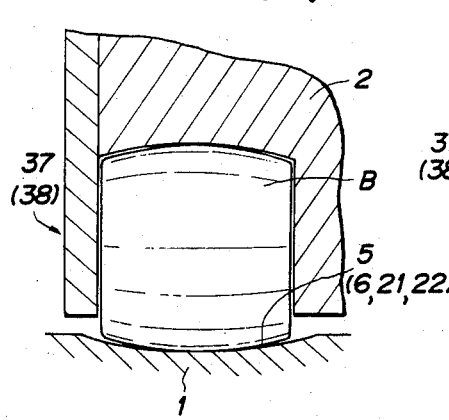
FIG. 11 is a sectional front elevational view of a modification of the linear slide roller bearing unit of the first embodiment shown in FIG. 1.
Figure 11B:
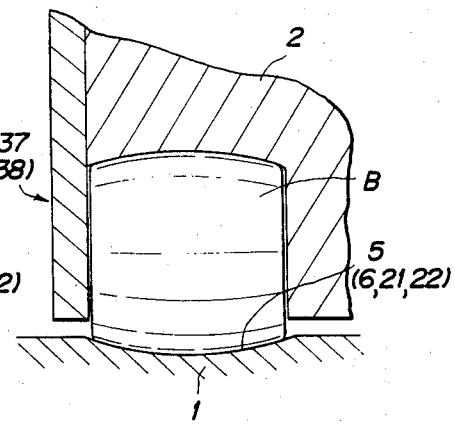

The curvature of the contour of the loaded roller rolling surfaces 5 to 8, 21, 22, 33 and 34 may be selected to be greater than the curvature of the outer configuration of the loaded ball $B_1$ as shown in FIG. 11a or may be equal to the same as shown in FIG. 11b, although the combination as shown in FIG. 11a provides a greater load bearing capacity and greater automatic centering effect of the balls.

As shown in FIGS. 1, 2 and 4, roller retainers 37 and 38 are attached to the peripheral surfaces of the guide ridges 31 and 32 so as to guide the barrel-shaped rollers $B_1$ circulated along the non-loaded roller rolling surfaces 35 and 36.

Figure 9A:
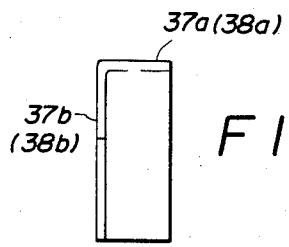
FIG. 9a is a front elevational view of a roller retainer on the skirt of the bearing block.
Figure 9B:
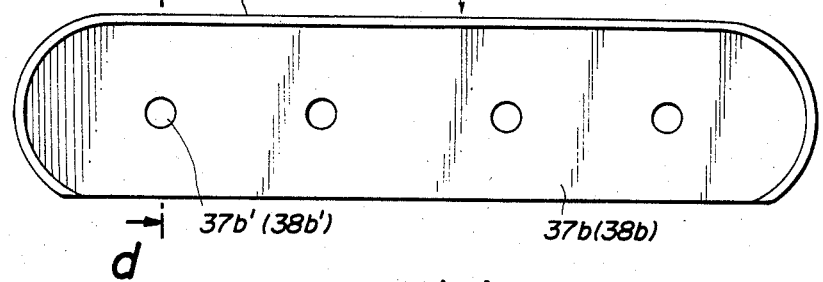
Figure 9C:
FIG. 9c is a bottom plan view of the roller retainer.
Figure 9D:
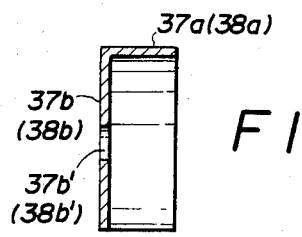
FIG. 9d is a sectional view taken along the line d—d of FIG. 9b.
Figure 10:
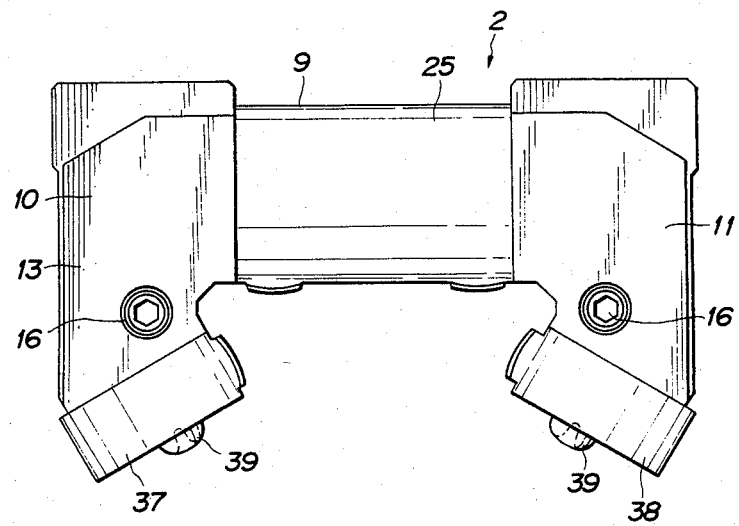
FIG. 10 is a front elevational view of the bearing block.

As shown in FIGS. 9a and 9b, the roller retainers 37 and 38 are constituted, respectively, by peripheral portions 37a and 38a bent in an elliptic form with its lower side removed, and elliptic side panels 37b and 38b closing one sides of respective peripheral portions 37a and 38a. As shown in FIGS. 1 and 2, these roller retainers 37 and 38 are secured to the end surfaces of the guide ridges 31 and 32 by means of screws 39 and 39 driven into the guide ridges 31 and 32 through respective holes 37b' and 38b' formed in the side panels 37b and 38b. The gaps formed between the inner surfaces 37' and 38' of the roller retainers 37,38 and the slanted surfaces 27,28 on the lower end of the bearing block 2 receive respective trains of barrel-shaped rollers B which are arrayed such that both axial ends of these rollers are held substantially in parallel with opposing surfaces of both side walls. With this arrangement, a multiplicity of barrel-shaped rollers B are circulated along the non-loaded rolling surfaces 33 and 34 and the non-loaded roller rolling surfaces 35 and 36 on the bearing block 2, while rotating about their own axes.

As will be clearly seen from FIG. 4, the barrel-shaped rollers B circulated in trains are guided at their both axial end surfaces by the slanted surfaces 27 and 28 on the lower end of the bearing block 2 and the inner surfaces 37' and 38' because both axial ends of the rollers oppose these surface across small clearances. Consequently, the undesirable skew of the rollers is avoided and a smooth sliding of the bearing block 2 is ensured.

Figure 12:
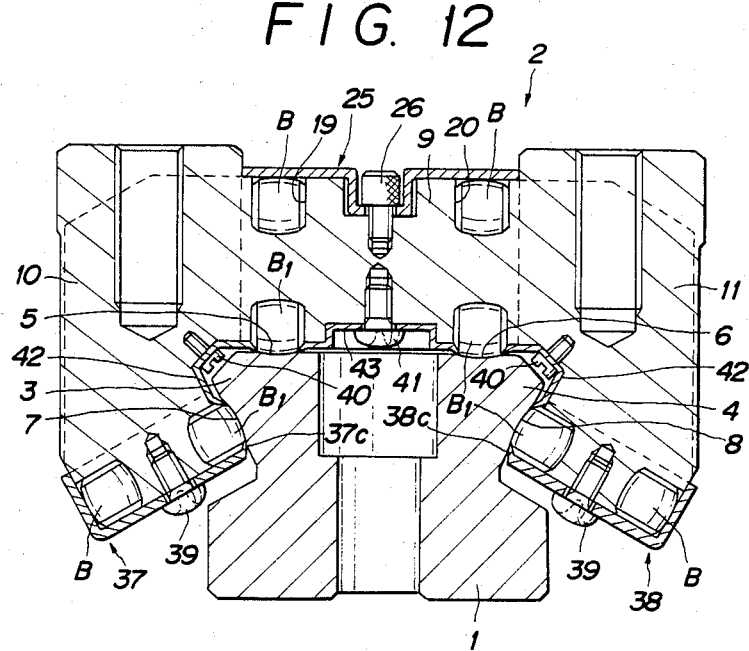
FIG. 12 is a sectional front elevational view of a linear slide roller bearing in accordance with a second embodiment of the invention.

FIG. 12 illustrates a modification of the first embodiment. In this Figure, the same reference numerals are used to denote the same parts or members as those of the first embodiment explained in connection with FIGS. 1 to 10. In this modification, retainer tabs 37c and 38c are provided on the free ends of the roller retainers 37 and 38 such as to retain the outer periphery of each barrel-shaped roller B. With this arrangement, it is possible to prevent the loaded rollers B from coming off and, hence, to facilitate the assembly of the bearing unit. In addition, substantially U-shaped attachments 42 and an attachment 43 having a hat-like cross-section are secured to the inner recess of the bearing block 2 at the centers of the roller retainers 37 and 38 by means of screws 40 and 41. These attachments 42 and 43 extend in the longitudinal direction of the bearing block 2 so as to hold the rollers B along the inner periphery of the roller circulating passages.

Figure 13:
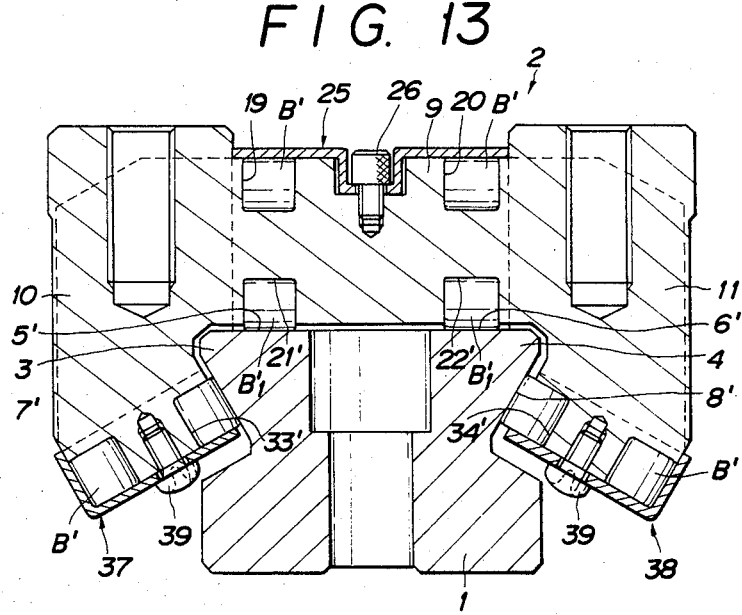
FIG. 13 is a sectional front elevational view of a modification of the linear slide roller bearing in accordance with the second embodiment.

FIG. 13 shows a second embodiment, in which the same reference numerals are used to denote the same parts or members as those used in the first embodiment. In this second embodiment, cylindrical rollers B' are used in place of the barrel-shaped rollers B used in the first embodiment.

The construction and operation of this second embodiment are substantially identical to those of the first embodiment, except that the loaded roller rolling surfaces 5' to 8' on the track shaft 1, loaded roller rolling surfaces 21', 22', 33', 34' on the bearing block 2 and the non-loaded roller rolling surfaces 23', 24', 35', 36' have flat contour conforming with the outer configuration of the cylindrical rollers B'. Further description of construction and operation of this second embodiment, therefore, are omitted.

Figure 14:
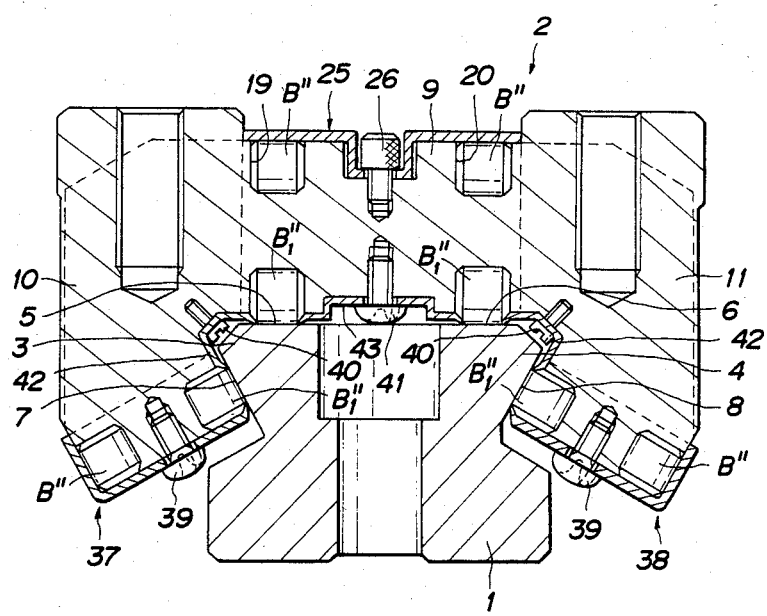
FIG. 14 is a sectional front elevational view of still another modification of the linear slide roller bearing of the second embodiment.

FIG. 14 shows a modification of the second embodiment in which cylindrical rollers B" chamfered at each of their end surfaces are used in place of the barrel-shaped rollers B used in the bearing unit shown in FIG. 12. Other portions are materially identical to those of the bearing unit shown in FIG. 12 so that further description is omitted.

Here, it is to be noted that the difference in the effect between barrel-shaped rollers and cylindrical rollers is that the barrel-shaped rollers B can provide greater load bearing capacity and higher automatic centering effect than the cylindrical rollers B', as will be understood from FIGS. 11a and 11b. Namely, when the barrel-shaped rollers B are used, the rollers $B_1$ makes point contact or line contact with the rolling surfaces 5 to 8, 21, 22, 33 and 34 because both the loaded roller $B_1$ and the cooperating loaded roller rolling surfaces 5 to 8, 21, 33 and 34 have arcuate contours, so that a greater degree of elastic deformation of the rollers and rolling surfaces is allowed to increase the load bearing capacity. Furthermore, the loaded roller $B_1$ can rock to the left and right about the point or line of contact, and the automatic centering effect is available within this region of rocking.

As has been described, according to the invention, there is provided a linear slide roller bearing unit in which left and right side ridges are projected from both sides of a track shaft and loaded roller rolling surfaces are formed on both sides of respective ridges so as to be directed obliquely upwardly and downwardly and to extend in the longitudinal direction of the track shaft, while a bearing block having a substantially inversed U-shaped cross-section is provided with loaded roller rolling surfaces which oppose the loaded roller rolling surfaces formed on the ridges of the track shaft.

It is, therefore, possible to support the load acting in all directions, by the rollers disposed in contact with these loaded roller rolling surfaces.

It is to be noted also that the roller circulating passages are formed by guide ridges formed on the slanted lower end surfaces of both skirts of the bearing block and roller retainers attached to the guide ridges. This arrangement eliminates the necessity for any machining of the roller rolling grooves in the skirts, so that the formation of the roller rolling surfaces is very much facilitated to lower the cost of the bearing unit as a whole.

What is claimed is:
1. A linear slide bearing unit comprising:
an elongated track shaft having left and right ridges projected laterally from both sides thereof and extending along the length thereof, each ridge being provided at each of its sides with a first loaded roller rolling surface directed vertically upward and a second loaded roller rolling surface directed obliquely downward;

a bearing block mounted on said track shaft for movement along the length of said track shaft, said bearing block being composed of a central section and two end plates, said central section having an upper horizontal flat portion and skirts depending from both sides of the upper horizontal flat portion, said upper horizontal flat portion being provided in its upper and lower sides with two pairs of non-loaded roller grooves and loaded roller grooves, said skirts having slanted lower end surfaces directly inwardly and downwardly, and said slanted lower surfaces being provided at their midportions with longitudinally extending guide ridges and at one side of said guide ridges with loaded roller rolling surfaces opposing to the obliquely downwardly directed loaded roller rolling surfaces on said track shaft and at the other sides of said guide ridges with non-loaded roller rolling surfaces, said end plates being attached to the longitudinal ends of said central section and each having four semicircular turning grooves each of which is connected at their one end with the corresponding one of said loaded roller grooves or surfaces in said bearing block central section and at their other end with the corresponding one of said non-loaded roller grooves or surfaces in said bearing block central section to form four endless tracks;

four roller trains comprising rollers interposed between the opposing loaded roller grooves in said bearing block and the loaded roller rolling surfaces on said track shaft and disposed on the non-loaded roller rolling grooves and the non-loaded roller rolling surfaces on said bearing block, each of said track shaft ridges being clamped by two trains of said rollers disposed on said first and second loaded roller rolling surfaces of each ridge;

side roller retainers secured to the end surfaces of said guide ridges of said skirts and adapted to guide and retain the rollers disposed on said loaded roller rolling surfaces and non-loaded roller rolling surfaces formed at both sides of respective guide ridges, each of said side roller retainers having a substantially L-shaped cross section having a flat side panel and a peripheral portion which includes a straight portion extending alone one longitudinal edge of said side panel and curved portions of semicircular sectional shape connected to opposite ends of said straight portion, said side panel being secured to the corresponding one of said guide ridge end surfaces, the straight portion of said peripheral portion cooperating with the corresponding one of said non-loaded roller rolling surfaces on one side of said guide ridges to form a non-loaded roller passage, the curved portions of said peripheral portion being adapted to cover the corresponding semicircular turning grooves in said end plates to form roller-turning passages; and an upper roller retainer secured to the upper surface of said bearing block and adapted to guide and retain said rollers disposed in the non-loaded roller rolling grooves formed in the upper surface of said bearing block, said upper roller retainer having a flat portion and guide portions formed integrally with said flat portion to project from opposite ends thereof, said flat portion of said upper roller retainer being secured to the upper surface of said bearing block central section so as to cover said non-loaded roller grooves to form non-loaded roller passages, said guide portions of said upper roller retainer being of a semicircular sectional shape and adapted to cover the corresponding semicircular turning grooves in said end plates to form roller-turning passages.

2. A linear slide roller bearing unit according to claim 1, wherein said rollers are barrel-shaped rollers having an outer configuration constituting a part of a sphere.

3. A linear slide roller bearing unit according to claim 1, wherein said rollers are cylindrical rollers.

* * * * *